United States Patent [19]
Satoh et al.

[11] Patent Number: 5,231,617
[45] Date of Patent: Jul. 27, 1993

[54] OPTICAL INFORMATION RECORDING AND REPRODUCING APPARATUS AND METHOD OF RECORDING AND REPRODUCING INFORMATION IN AN OPTICAL DISK UNIT

[75] Inventors: Isao Satoh, Neyagawa; Sadao Mizuno, Ibaraki; Noboru Yamada, Hirakata; Yasuhiro Gotoh, Kadoma, all of Japan

[73] Assignee: Matsushita Electric Industrial Co., Ltd., Osaka, Japan

[21] Appl. No.: 938,675

[22] Filed: Sep. 1, 1992

Related U.S. Application Data

[62] Division of Ser. No. 550,902, Jul. 11, 1990, abandoned.

[30] Foreign Application Priority Data

Jul. 24, 1989 [JP] Japan .................................. 1-190996

[51] Int. Cl.⁵ .............................................. G11B 17/14
[52] U.S. Cl. ...................................... 369/36; 369/178; 369/181; 369/198; 369/44.26
[58] Field of Search .................. 369/34, 36, 38, 39, 369/178, 180, 181, 195, 199, 57, 65, 44.26, 44.28, 198, 33; 360/98.01, 98.02, 98.03, 77.07, 78.04

[56] References Cited

U.S. PATENT DOCUMENTS

| | | | |
|---|---|---|---|
| 4,387,452 | 6/1983 | Bricot et al. | 369/199 X |
| 4,674,076 | 6/1987 | Hsieh et al. | 369/33 |
| 4,807,063 | 2/1989 | Moteki | 360/98.01 X |
| 4,879,704 | 11/1989 | Takagi et al. | 369/14 |
| 4,888,751 | 12/1989 | Yoshimaru et al. | 369/36 |
| 4,896,228 | 1/1990 | Amakasu et al. | 360/98.01 X |

FOREIGN PATENT DOCUMENTS

| | | |
|---|---|---|
| 63-171441 | 7/1988 | Japan . |
| 64-35734 | 2/1989 | Japan . |
| 2-165439 | 6/1990 | Japan . |

*Primary Examiner*—Eugene R. LaRoche
*Assistant Examiner*—Tan Nguyen
*Attorney, Agent, or Firm*—Stevens, Davis, Miller & Mosher

[57] ABSTRACT

The present invention provides a large-capacity stack type optical disk unit capable of information recording and reproducing operation at a high speed and an optical information recording and reproducing apparatus for recording/reproducing information onto/from the stack type optical disk unit. The optical information recording and reproducing apparatus comprises a stack type optical disk unit having N recording faces, the sector starting position on the respective recording faces are displaced by a sector as unit from one face to another, one stationary optical units including a laser light source, a collimator, a reflector and a detector for a reflected beam from the recording faces, N sets of focusing units each for focusing a collimated beam onto respective recording faces, a beam distribution unit for distributing the collimated beam to the focusing units, and a servo unit for focussing outputs from the focusing units onto tracks of the recording faces and for performing tracking. Owing to the above described configuration, information can be consecutively recorded onto/reproduced from a desired track sector without an extra disk rotation waiting time when recording/reproducing operation is switched from a recording face to an adjacent recording face of the stack type optical disk unit.

6 Claims, 6 Drawing Sheets

OPTICAL INFORMATION RECORDING AND REPRODUCING APPARATUS AND METHOD OF RECORDING AND REPRODUCING INFORMATION IN AN OPTICAL DISK UNIT

This application is a division of application Ser. No. 07/550,902, filed Jul. 11, 1990 (abandoned).

BACKGROUND OF THE INVENTION

1. Field of the Invention

The present invention relates to an optical information recording and reproducing apparatus for recording/reproducing information onto/from optical disks and an optical disk unit used by such apparatus, and in particular to a stack type optical disk unit and an optical information recording and reproducing apparatus using the disk unit.

2. Description of the Related Art

In recent years, optical disk memory systems have attracted attention as allowing significantly higher recording density and larger capacity as compared with conventional magnetic recording and it is now being studied in various places.

It is well known that optical disks have features in large capacity and interchangeability which are not found in conventional magnetic disks. As a result of recent performance improvement of magnetic disks, however, magnetic disk products have been announced having a capacity of approximately 750 MB with a 5.25 inch disk and having a capacity of approximately 250 MB with a 3.5 inch disk.

By comparing memory capacities of optical disks with those of magnetic disks, the following conclusions can be drawn:

(1) those disks are nearly equal in line recording density or magnetic disks are slightly superior in line recording density to optical disks;

(2) optical disks are approximately several to ten times larger in track density than magnetic disks; and (3) the number of recording faces is one for optical disks, whereas it is ten or more for magnetic disks. (Although each optical disk has two recording faces, its online memory capacity is equivalent to one face because optical disks must be turned over.)

From the foregoing, it is apparent that optical disks have no advantage over magnetic disks with the exception that optical disks are superior in track density to magnetic disks. In particular, the difference in number of recording faces is decisive. When optical disks are compared with magnetic disks in apparatus memory capacity, optical disks have little advantage over magnetic disks in the present situation.

A conventional optical information recording and reproducing apparatus for recording/reproducing information onto/from both faces of an optical disk is shown in Japanese Patent Application No. 63-319072, for example.

FIG. 8 is a configuration diagram of this conventional optical information recording and reproducing apparatus which has been developed and proposed by MATSUSHITA. Numeral 51 an optical disk, 17 a motor, 52 a stationary optical section for emitting a collimated beam 53, and 7 a beam distribution section for selectively distributing the collimated beam 53 of the stationary optical section 52 to movable optical sections 34 and 35. Numerals 34 and 35 denote movable optical sections for focusing the laser beam 53 onto signal recording tracks located on both the recording faces of the optical disk 51. Numerals 36 and 37 denote linear motors for transporting the movable optical sections 34 and 35 in the radial direction of the optical disk 51 and for searching a target track. Numerals 38 and 39 denote rails for guiding the linear motors 36 and 37. Numeral 18 denotes a laser, numeral 19 a collimation lens system for shaping the laser beam emitted from the laser 18 into a parallel beam having a circular section, numeral 21 a polarization beam splitter for reflecting the beam, which is reflected by the optical disk 51, toward a photodetector 23 for signal detection instead of returning the beam to the laser 18, numeral 23 a photodetector for receiving the beam reflected by the optical disk 51 and for detecting a servo signal and a reproduced signal, numeral 24 a head amplifier for amplifying and processing a signal outputted from the photodetector 23, numeral 40 a variable phase plate for providing the collimated beam 53 with a constant phase rotation, numeral 41 a polarization beam splitter, numeral 42 a quarter wave longth plate ($\lambda/4$, $\lambda$ is a wave length of a laser beam), numeral 43 a total reflection prism, and numeral 44 denotes a $\lambda/4$ plate. Numerals 45 and 46 denote objective lenses for focusing the collimated beam onto a track of the optical disk 51, numerals 47 and 48 rectangular prisms, numerals 49 and 50 actuators for moving the objective lenses 45 and 46 for the purpose of focusing or tracking. Numeral 53 denotes a collimated beam, numeral 105 a servo error signal detected by the head amplifier 24, and numeral 104 a reproduced signal supplied from the optical disk 51.

Operation of the optical information recording and reproducing apparatus configured as heretofore described will hereafter be described. The collimated beam 53 of the laser 18 collimated by the laser 19 is incident upon the optical distribution section 7. Assuming now that data are recorded and reproduced by the movable optical section 35, the collimated beam 53 is provided with phase rotation of $\lambda/2$ by the variable phase plate 40, totally reflected by the polarization beam splitter 41, and applied to the rectangular prism 48 of the movable optical section 35 via the rectangular prism 43 and the $\lambda/4$ plate 44. The collimated beam reflected by the rectangular prism 48 is focused onto a surface track of the optical disk 51 by the objective lens 46. By applying photoelectric conversion to the reflected beam, which is supplied from the optical disk 51, in the photodetector 23 and driving the actuator 50 by the servo error signal 105 of the head amplifier 24, the objective lens 46 always focuses the laser beam onto a track and performs tracking. If the laser of the stationary optical section 52 is modulated in intensity with the recording power level by a data signal, data are recorded onto the corresponding track.

When data are recorded or reproduced by the movable optical section 34, the variable phase plate 40 operates with O phase to transmit the collimated beam 53 as it is through the polarization beam splitter 41. The collimated beam transmitted through the $\lambda/4$ plate 42 is reflected by the rectangular prism 47 of the movable optical section 34 and focused onto a track, which is located on the reverse of the optical disk 51, by the objective lens 45. In the same way as the movable optical section 35, the objective lens 45 drives the actuator 49 by using the servo error signal 105 and thus focuses/tracks the laser beam onto the track.

When the recording and reproducing face of the optical disk is switched from the obverse to the reverse or from the reverse to the obverse by the optical distribution section, however, it takes processing time of approximately several to 100 milliseconds to perform focus servo to a track, then tracking servo pull-in, and track search in the above described configuration. This results in a problem in that the throughput of the apparatus cannot be raised by dealing with the stack type recording face in the same way as a magnetic disk cylinder to reduce the number of search times.

Further, in case recording and reproducing of one recording face is first performed and recording and reproducing of the next recording face is then performed as the processing of the stack type recording faces, servo and track search processing similar to that described above is necessary at the time of transfer to the next recording face. This results in a problem that information cannot be continuously recorded/reproduced.

On the other hand, the above described problems can be solved by providing every recording face with an optical head and a processing circuit system including an independent laser light source. However, problems of increased size, complexity and cost of the apparatus are posed.

SUMMARY OF THE INVENTION

In view of these points, an object of the present invention is to provide a stack type optical disk unit comprising a plurality of disklike recording faces disposed in stack capable of recording/reproducing information at high speed and an optical information recording and reproducing apparatus for recording/reproducing information onto/from the stack type optical disk unit.

In accordance with the present invention, a stack type optical disk unit is formed by stacking a plurality of disklike recording faces each having a track divided into sectors forming units of information recording/reproducing operation and so fixing the disklike recording faces to an axis of rotation of the disk unit as to be displaced by a fixed angle in the rotation direction with reference to a sector position of a recording face located at the start end of the axis every disklike recording face, or a stack type optical disk unit is formed by so fixing disklike recording faces each having a spiral track successively to the axis of rotation of the disk unit commencing with a disk recording face located at the start end of the axis as to be inverted in the direction of winding of the spiral track every disklike recording face.

In accordance with the present invention, an information recording and reproducing apparatus comprises an optical disk formed by stacking N disklike recording faces in stack each having a track divided into sectors forming units of information recording/reproducing operation, one stationary optical means including a laser light source, a collimator, a reflector, and a detector for a reflected beam, N sets of focusing means respectively for focusing a collimated beam generated by said stationary optical means onto the disklike recording faces, beam distribution means for selectively distributing the collimated beam to a set of the N focusing means, servo means for focusing a focused beam from the focusing means onto a track of the recording faces and for performing tracking, search means for transferring the focusing means to a target track, and a set of information recording and reproducing means.

Further, in accordance with the present invention, an information recording and reproducing apparatus comprises an optical disk unit formed by stacking and fixing N disklike recording faces, two sets of stationary optical means each including a laser light source, a collimator, a reflector, and a detector for a reflected beam, N sets of focusing means respectively for focusing collimated beams generated by the stationary optical means onto the disklike recording faces, beam distribution means for selectively distributing the collimated beams to two out of the N sets of focusing means simultaneously, servo means for focusing focused beams from the focused means onto tracks of the recording faces and for performing tracking, search means for transferring the focusing means to target tracks, and two sets of information recording and reproducing means for recording/reproducing information into/from predetermined sectors.

When information is to be recorded onto/reproduced from disklike recording faces of the stack type optical disk unit successively and consecutively, the above described configuration according to the present invention makes it possible to complete focus tracking to a target track of the disklike recording face and track search within a waiting time lasting until a desired sector on a disklike recording face to be accessed succeedingly passes through the beam position of the focusing means, consecutive information recording and reproducing operation being thus attained.

Further, the beam distribution means distributes two collimated beams to focusing means corresponding to a disklike recording face whereto/wherefrom information is being recorded/reproduced and a disklike recording face whereto/whereform information is to be recorded/reproduced. As a result, time loss required for focus tracking pull-in control and desired track search is eliminated, and information recording and reproducing operation can be continuously conducted.

As heretofore described, the present invention makes it possible to realize a simple, economical optical information recording and reproducing apparatus having an extremely large storage capacity by the provision of beam distribution means for selectively distributing the collimated beam(s) generated by a set of or two sets of stationary optical means of the stack type optical disk unit formed by stacking a plurality of recording faces to optical head(s) of recording face(s) whereto/wherefrom information should be recorded/reproduced. Further, it is possible to eliminate useless rotation waiting caused by distribution of the collimated beam from the stationary optical system to optical heads by so stacking and fixing the recording faces as to be displaced each other by a fixed angle, data recording and reproducing operation at a high, fixed data transfer rate being thus attained. Further, track search with a long stroke is made unnecessary by conducting the recording/reproducing operation with respect to recording faces of the stack type optical disk unit formed by alternately disposing recording faces having two kinds of spiral tracks formed thereon from a recording face to another. As a result, a large amount of sequential data can be recorded at high speed. The present invention brings about marked practical effects.

DESCRIPTION OF THE PREFERRED EMBODIMENTS

An optical information recording and reproducing apparatus and a stack type optical disk unit in an embodiment of the present invention will hereafter be described by referring to drawings.

Figure 1:
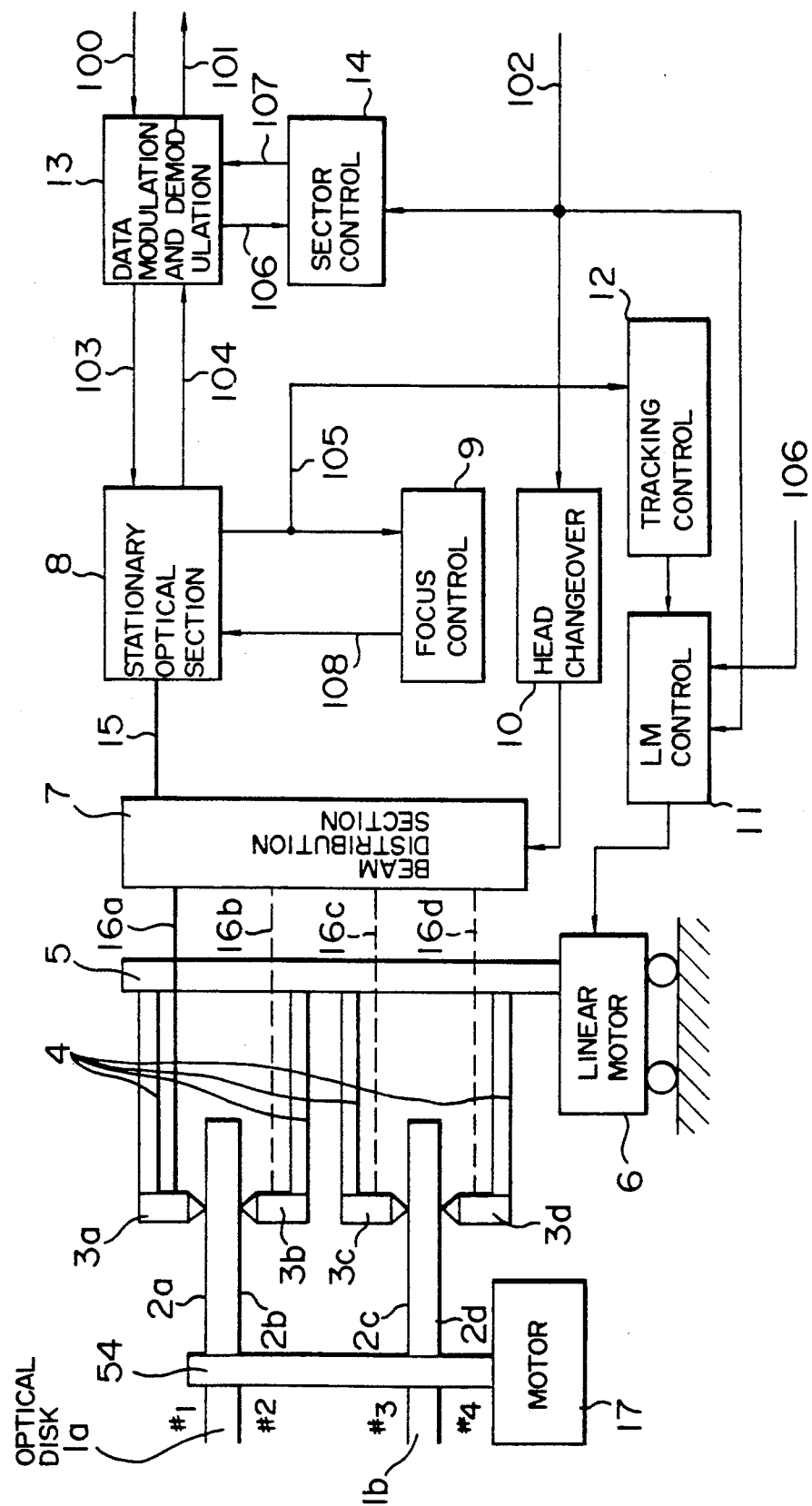
FIG. 1 is a configuration diagram of an optical information recording and reproducing apparatus in a first embodiment of the present invention.

FIG. 1 is a configuration diagram of an optical information recording and reproducing apparatus in a first embodiment of the present invention. In FIG. 1, 1a and 1b denote optical disks stacked and fixed to an axis of rotation of the shaft 54 of a motor 17. (Hereafter, 1a and 1b are collectively referred to as 1. The same notation also applies to other numerals.) Characters 2a, 2b, 2c and 2d denote recording faces #1, #2, #3 and #4 of the stacked optical disks 1a and 1b, respectively. Characters 3a, 3b, 3c and 3d denote optical heads for focusing laser beams onto the recording faces 2. Numeral 4 denotes levers for supporting the optical heads 3. Numeral 5 denotes a support section for supporting the optical heads 3. Numeral 6 denotes a linear motor for transporting the support section 5, making the optical head 3 gain access to a target track, and holding that track. Numeral 7 denotes an beam distribution section for selectively distributing a collimated beam 15 supplied from a stationary optical section 8 to specific optical heads 3. Numeral 8 denotes a stationary optical section for generating a collimated beam, numeral 9 a focus control circuit for finely moving a collimation lens of the stationary optical section 8 to perform focus control, numeral 10 a head changeover control circuit for distributing the collimated beam 15 to any one of beams 16a, 16b, 16c and 16d incident upon the optical head 3 by using the beam distribution section 7, numeral 11 a linear motor control circuit for making the optical head 3 gain access to the target track by using the linear motor 6, numeral 12 a tracking control circuit for finely moving the linear motor 6 on the basis of a servo error signal 105 supplied from the stationary optical section 8 and tracking a predetermined track, numeral 13 a data modulation and demodulation circuit for modulating input data 100 to output it as a modulated signal 103 and for demodulating a reproduced signal 104 to output it as output data 101, numeral 14 a sector control circuit for generating a gate signal 107 to control recording/reproducing data onto/from a target sector, and numeral 15 a collimated beam. Characters 16a, 16b, 16c and 16d denote light beams distributed to the optical heads 3a, 3b, 3c and 3d in the beam distribution section 7. Numeral 17 denotes a motor for rotating the optical disks 1, and numeral 54 denotes a disk rotation shaft fixed to the spindle of the motor 17. Numeral 100 denotes input data to be recorded onto the optical disks 1, numeral 101 output data reproduced from the optical disks 1, numeral 102 an address signal for specifying the position of a track sector, numeral 103 modulated data, numeral 104 a reproduced signal supplied from the optical disks, numeral 105 a servo error signal for focus and tracking control, numeral 106 a reproduction address signal, numeral 107 a sector gate signal which indicates that the target sector has been detected, and numeral 108 a focus drive signal for driving a focusing actuator of the stationary optical section 8.

Operation of the optical information recording and reproducing apparatus which records/reproduces information onto/from the stack type optical disk unit and which is configured as described above will hereafter be described.

The address signal 102 is applied to the head changeover control circuit 10, the linear motor control circuit 11 and the sector control circuit 14 to perform operations of selection of the optical head 3, focus/tracking control, track search, sector detection and data recording/reproduction.

By taking the case where the optical head 3a has been selected as an example, its operation will hereafter be described.

(1) In response to the address signal 102, the beam distribution section 7 selects the collimated beam 15 of the stationary optical section 8 and applies the light beam 16a to the predetermined optical head 3a.

(2) The laser beam of the optical head 3a is reflected by the recording faces #1 and #2 of the optical disk 1a, detected by the stationary optical section 8 as the servo error signal 105, and inputted to the focus control circuit 9. The focus control circuit 9 transmits the focus drive signal 108 to the stationary optical section 8 to drive an actuator and exercise focus control over the optical head 3a.

(3) The tracking control circuit 12 exercises tracking control over the track.

(4) The linear motor control circuit 11 moves the linear motor 6 and searches a track indicated by the address signal 102 while referring to the reproduction address signal 106.

(5) When the sector control circuit 14 has detected the target sector, the sector gate signal 107 is outputted to the data modulation and demodulation circuit 13. In data recording operation, the input data 100 is modulated by the data modulation and demodulation circuit 13. The resultant modulated signal is applied to the stationary optical section 8 as the modulated data signal 103. The laser beam generated in the stationary optical section 8 is modulated in intensity by the modulated data signal 103, and data are recorded onto a target sector of the recording face #1, 2a by the optical head 3a. In a data reproduction operation, the reflected beam supplied from the recording face #1, 2a via the optical head 3a undergoes photoelectric conversion in the stationary optical section 8. The resultant signal is modulated by the data modulation and demodulation circuit 13 in accordance with the sector gate signal 107 and outputted as the output data 101.

(6) If the address signal 102 succeedingly indicates the optical head 3b, the head changeover control circuit 10 so controls the beam distribution section 7 as to output the collimated beam 15 to the beam 16b.

(7) In the same way as the operation heretofore described, predetermined data are recorded and reproduced.

As described above, the present embodiment makes it possible to realize an optical information recording and reproducing apparatus having a simple configuration, an extremely large memory capacity and an economical advantage by providing one stationary optical section, N optical heads (a focusing section), and a beam distribution section for selectively distributing the collimated beam generated by the stationary optical section among optical heads in order to record/reproduce information onto/from the stack type optical disk unit comprising N (where N≧2) stacked recording faces.

Figure 2:
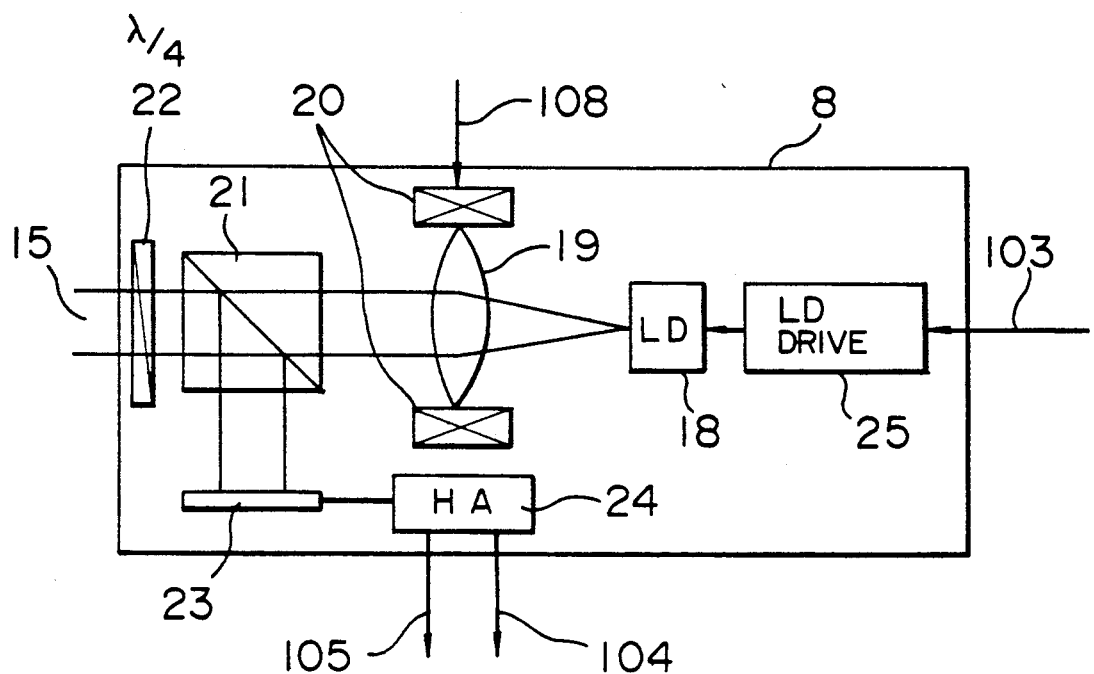
FIG. 2 is a configuration diagram of an embodiment of a stationary optical section shown in FIG. 1.

FIG. 2 is a configuration diagram of an embodiment of the stationary optical section 8 shown in FIG. 1. In FIG. 2, numeral 18 denotes a laser, numeral 19 a collimation lens system for shaping the beam emitted from the laser 18 into a parallel beam having a circular cross section, and numeral 20 a focusing actuator for driving the collimation lens system 19 in response to the focus drive signal 108 to focus or diverge the collimated beam 15 and thereby focus the output of the optical head 3 just onto the recording face 2. Numeral 21 denotes a polarization beam splitter for rotating the wave front of the reflected beam supplied from the optical disk 1 by means of a λ/4 plate 22, reflecting the beam toward a photodetector 23 without returning it to the laser 18, and thus detecting the signal. Numeral 22 denotes a λ/4 plate. Numeral 23 denotes a photodetector for receiving the reflected beam supplied from the optical disks 1 and detecting the servo error signal 105 and the reproduced signal 104. Numeral 24 denotes a head amplifier for amplifying and processing the output signal of the photodetector 23. Numeral 25 denotes a laser drive circuit for modulating the intensity of the laser 18 on the basis of the signal 103.

Figure 3:
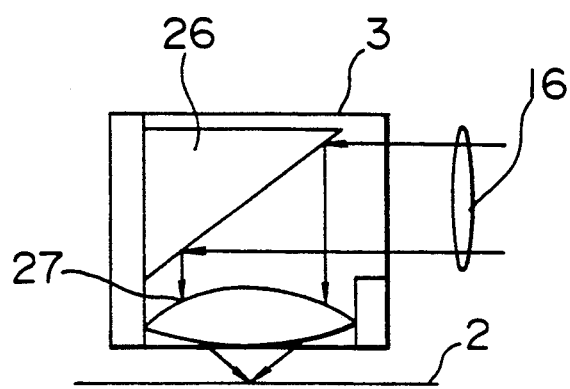
FIG. 3 is a configuration diagram of an embodiment of an optical head which is a focusing section of FIG. 1.

FIG. 3 is a configuration diagram of an embodiment of the optical head 3 which is a focusing section shown in FIG. 1. In FIG. 3, numeral 26 denotes a rectangular prism, and numeral 27 denotes a objective lens for focusing the optical beam 16 onto the recording faces 2 of the optical disks with an accuracy of submicron order. The light beam 16 selected by the beam distribution section 7 is reflected by the rectangular prism 26 and focused onto the recording face 2 by the objective lens 27. Deviation of focusing position caused by deflection of the recording face is obtained by finely moving the collimation lens system 19 by means of the actuator 20 shown in FIG. 2 so that the incidence angle of the optical beam 16 may slightly diverge or converge from the parallel beam.

In the embodiments shown in FIGS. 2 and 3 heretofore described, the collimated beam supplied from a stationary optical section is distributed to one of N optical heads each comprising an objective lens and a rectangular prism, and information is recorded onto/reproduced from a predetermined recording face by one selected optical head, resulting in simplified and small-sized configuration of the optical system.

Figure 4:
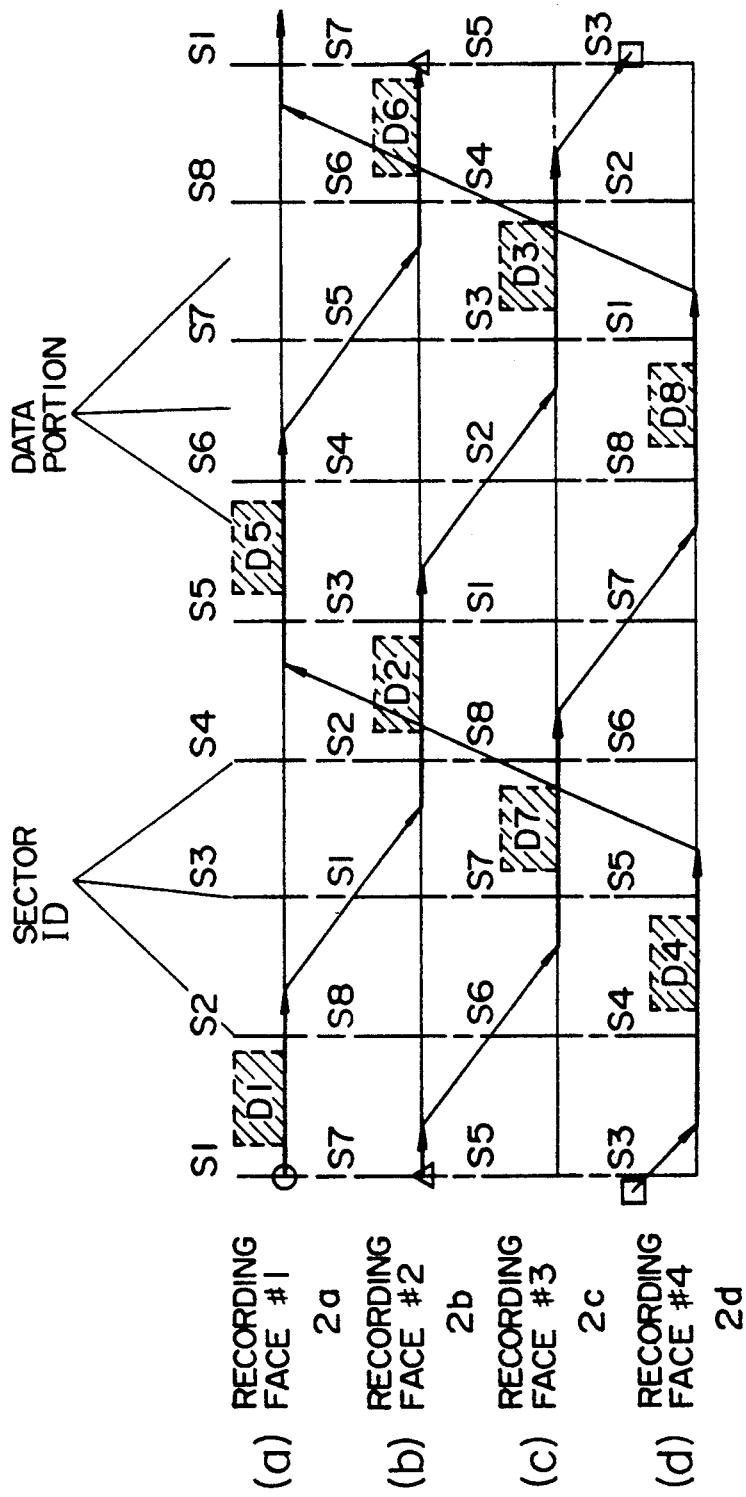
FIG. 4 shows a first embodiment of configuration of recording faces in a stack type optical disk unit according to the present invention.

FIG. 4 shows a first embodiment of configuration of a recording face of the stack type optical disk unit applied to the optical information recording and reproducing apparatus shown in FIG. 1.

In FIG. 4, S1, S2, - - -, S8 denote sectors per track, and in particular to sector ID'S (identifiers of sectors each having an address recorded thereon). With reference to the recording face #1, 2a, the recording face #2, 2b is so disposed as to have sector No. displaced by two sectors. Further, the recording face #3, 2c is so disposed as to be displaced from the recording face #2, 2b by two sectors. The recording face #4, 2d is so disposed as to be displaced from the recording face #3, 2c by two sectors. Those recording faces are fixed to the disk rotation shaft 54 of the motor 17. Assuming now that the recording face #1 is also adjacent to the recording face #4, therefore, adjacent recording faces are so fixed to the disk rotation shaft 54 and stacked as to be displaced by a fixed number of sectors (herein two sectors). State transition lines represented by arrows of FIG. 4 show sector access history in recording/reproducing data D1–D8 corresponding to eight sectors consecutively into data portions of sectors beginning with the sector S1 of the recording face #1, 2a. Mutual coupling of the state transition lines is indicated by symbols such as ○, □ and △.

Information recording operation of the stack type optical disk unit shown in FIG. 4, which is used in the embodiment of the optical information recording and reproducing apparatus shown in FIG. 1, will hereafter be described.

The data D1 is recorded into the sector S1 of the recording face #1, 2a by the optical head 3a. Thereafter, changeover to the optical head 3b is performed and servo pull-in and track search are performed with respect to the recording face #2, 2b. The data D2 is thus recorded into the next sector S2. After data recording onto the recording face #2, 2b, changeover to the optical head 3c as well as servo pull-in and track search processing are performed. Thereafter, data D3 is recorded into the sector S3. Similarly, data D4–D7 are recorded. The data D8 is recorded into the sector S8 of the recording face #4, 2d by the optical head 3d. In this way, changeover of the optical head 3 and processing of servo pull-in and track search are performed in an interval corresponding to two sectors, data being thus consecutively recorded. Data reproduction operation is also performed in the same way.

Figure 5:
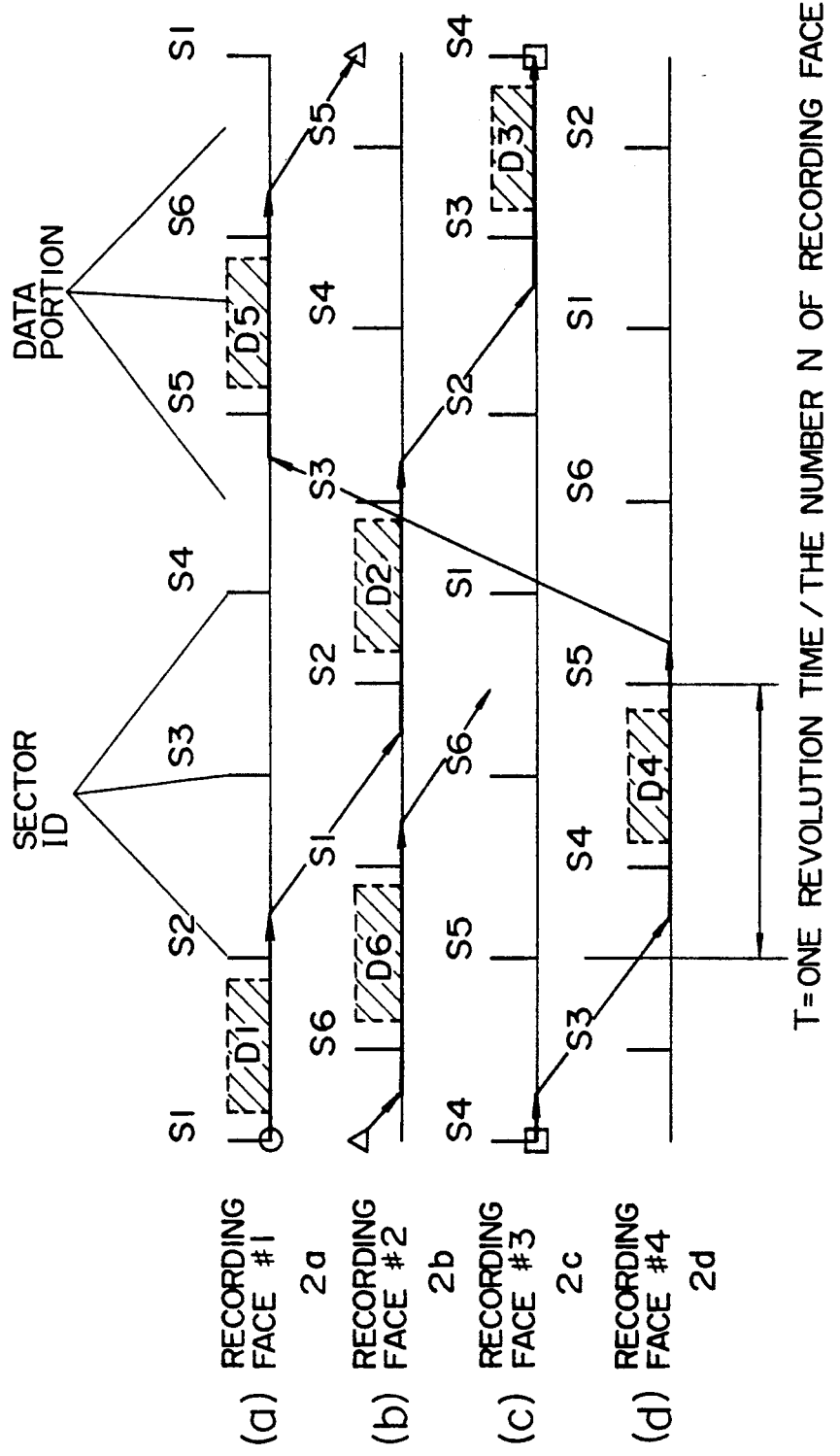
FIG. 5 shows a second embodiment of configuration of recording faces in a stack type optical disk unit.

FIG. 5 is a diagram showing a second embodiment of a configuration of recording faces of the stack type optical disk unit applied to the optical information recording and reproducing apparatus shown in FIG. 1.

In FIG. 5, S1, S2, - - -, S6 denote sectors per track. With the recording face #1, 2a as a reference, the recording face #2, 2b is so positioned as to be displaced by an angle (corresponding to an interval T) equivalent to (360°/the number of recording faces). Further, the recording face #3, 2c is so fixed to the rotation shaft of the motor 17 as to be displaced from the recording face #2, 2b by the interval T. The recording face #4, 2d is so fixed to the rotation shaft of the motor 2 as to be displaced from the recording face #3, 2c by the interval T. That is to say, adjacent recording faces are so fixed to the rotation shaft as to be displaced relative to each other in the rotation direction by a fixed angle (or by the interval T in terms of time). State transition lines represented by arrows of FIG. 5 show the history of sector access for recording consecutively data corresponding to six sectors beginning with the sector S1 of the recording face #1, 2a.

Operation of recording data into the stack type optical disk unit of FIG. 5 in the embodiment of FIG. 1 will now be described.

Data D1 is recorded into the sector S1 of the recording face #1, 2a by the optical head 3a. Thereafter, changeover to the optical head 3b is performed, and servo pull-in and track search are conducted with respect to the recording face #2, 2b, Data D2 is recorded into the sector S2 of the recording face #2, 2b. After the data D2 has been recorded onto the recording face #2, 2b, changeover to the optical head 3c and processing of servo pull-in and track search are performed. Thereafter, data D3 is recorded into the sector S3 of the recording face #3, 2c. Data D6 is recorded into the sector S6 of the recording face #2, 2b by the optical head 3b. In this way, changeover of the optical head 3 and processing of servo and track search are conducted in the interval T. Data are thus recorded consecutively. Data reproduction operation is also performed in the same way.

FIG. 5 shows the case where the number of sectors per track is not divisible by the number N of recording faces. Displacement between recording faces (relative rotation angle) is made constant to make the sector rotation waiting time of optical heads equal.

In the embodiments shown in FIGS. 4 and 5, recording faces are disposed while relatively rotating recording faces by an angle equivalent to a fixed number of sectors or 360° divided by the number of recording faces. In changeover of recording faces, therefore, it is possible to secure preparation time for optical heads to be ready for a recording/reproducing operation. Without causing useless rotation waiting, therefore, data can be recorded/reproduced at a high, constant data transfer speed.

That is to say, processing required for servo pull-in and track search when distribution of the light beam among optical heads is changed over, which is a problem caused when tracks having identical radii on stacked recording faces are processed in the same way as cylinders of a magnetic disk, can be absorbed by so fixing recording faces that sector positions of adjacent faces may have displacement of a fixed angle therebetween.

Figure 6:
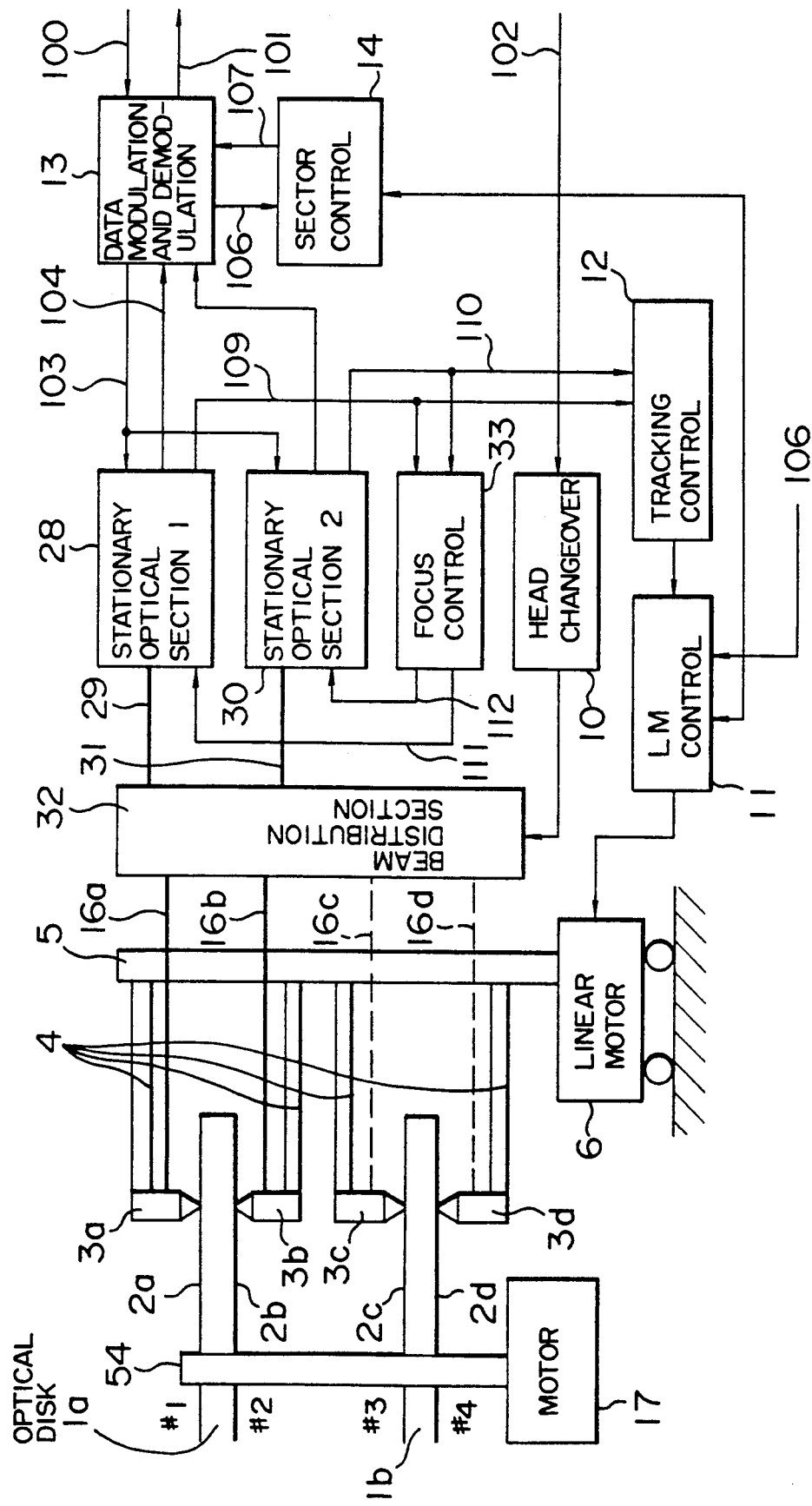
FIG. 6 is a configuration diagram of an optical information recording and reproducing apparatus in a second embodiment of the present invention.

FIG. 6 is a configuration diagram of an optical information recording and reproducing apparatus in a second embodiment of the present invention. In FIG. 6, the same numerals and characters as those of FIG. 1 represent components identical with those of FIG. 1. Numeral 28 denotes a first stationary optical section which corresponds to the section 8 of FIG. 1 and which generates a first collimated beam 29. Numeral 29 denotes a collimated beam generated by the first stationary section 28. Numeral 30 denotes a second stationary optical section for generating a second collimated beam 31. Numeral 31 denotes a collimated beam generated by the second stationary optical section 30. Numeral 32 denotes a beam distribution section for outputting the collimated beams 29 and 31 selectively as two of light beams 16a, 16b, 16c and 16d and making two of optical heads 3a, 3b, 3c and 3d simultaneously ready for recording/reproducing operation. Numeral 33 denotes a focus control circuit for driving collimation lenses of the stationary optical sections 28 and 30 to effect focus control. Numerals 109 and 110 denote servo error signals supplied from the stationary optical sections 28 and 30, respectively. Numerals 111 and 112 denote focus drive signals to be supplied to stationary optical sections 28 and 30, respectively.

Operation of the optical information recording and reproducing apparatus configured as described above will hereafter be described.

The address signal 102 is inputted to the head changeover control circuit 10, the linear motor control circuit 11 and the sector control circuit 14. Operations of selection of two optical heads out of four optical heads 3, focus tracking control of the selected optical heads 3, track search, sector detection and data recording/reproduction are performed.

By taking the case where the optical heads 3a and 3b have been selected, its data recording operation will hereafter be described.

(1) In response to the address signal 102, the optical distribution section 32 selects the collimated beams 29 and 31 supplied from the stationary optical sections 28 and 30, and apply light beams 16a and 16b onto predetermined optical heads 3a and 3b.

(2) The laser beam of the optical head 3a is reflected by the recording face #1, 2a of the optical disk 1a, detected in the stationary optical section 28 as the servo error signal 109, and inputted to the focus control circuit 33. The focus control circuit 33 sends the focus drive signal 112 to exercise focus control over the optical head 3b.

(3) Succeedingly, the tracking control circuit 12 exercises tracking control to make the optical disks 3a and 3b follow tracks of the recording faces #1 and #2.

(4) The linear motor control circuit 11 moves the linear motor 6 and searches a track indicated by the address signal 102 while referring to the reproduced address signal 106.

(5) When the sector control circuit has detected the target sector, the sector gate signal 107 is outputted to the data modulation and demodulation circuit 13. In the case of a data recording operation, the input data 100 is modulated by the data modulation and demodulation circuit 13. The modulated data signal 103 is applied to the first stationary optical section 28. The laser beam generated in the stationary optical section 28 is modulated in intensity by the modulated data signal 103. The data D1 is recorded into a specified sector of the recording face #1, 2a by the optical head 3a.

(6) Succeedingly, the address signal 102 and the head changeover control circuit 10 control the beam distribution section 32, output the collimated beam 29 to the beam 16c, perform processing similar to that described in (1)-(4), and make the optical head 3c always ready for recording and reproduction with respect to the recording face #3, 2c.

(7) The laser beam generated in the second stationary optical section 30 is modulated in intensity by the modulated data signal 103 of the next sector. The data D2 is thus recorded into a predetermined sector of the recording face #2, 2b by the optical head 3b.

(8) Succeedingly, the address signal 102 and the head changeover control circuit 10 make the beam distribution section 32 output the collimated beam 31 to the beam 16 and make the optical head 3d always ready for recording and reproduction with respect to the recording face #4, 2d.

(9) The laser beam generated in the first stationary optical section 28 is modulated in intensity by the modulated data signal 103. The data D3 is thus recorded into a specified sector of the recording face #3, 2c by the optical head 3c.

(10) Thereafter, data D4, D5 and so on are recorded in the same way as the foregoing description.

As heretofore described, two collimated beams 29 and 31 are alternately distributed to the optical head 3. While one optical head is conducting the recording/reproducing operation, therefore, remaining optical heads prepare for a recording/reproducing operation with respect to the next recording face. Processing peculiar to optical disk such as focus tracking control of the optical head or track search is thus performed simultaneously in parallel. It is thus possible to record/reproduce information onto/from the stack type optical disk unit consecutively without interruption.

Figure 7:
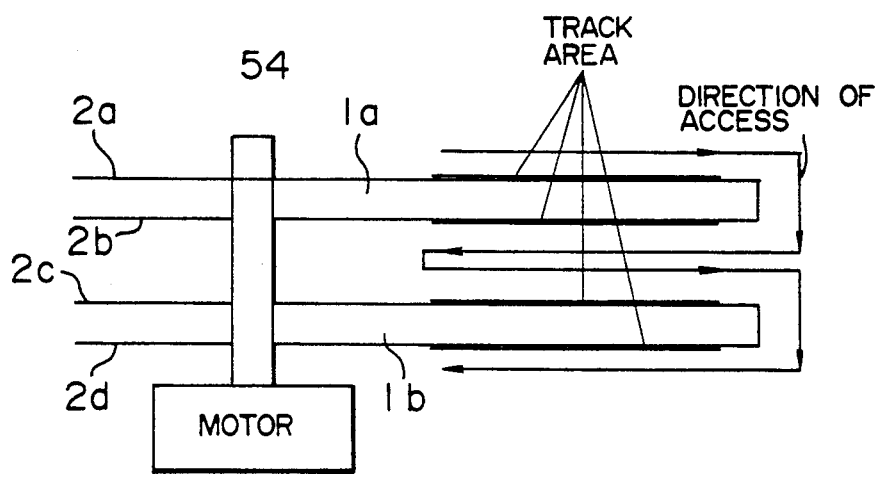
FIG. 7 shows a recording and reproducing method and the configuration of a stack type optical disk unit in a third embodiment.
Figure 8:
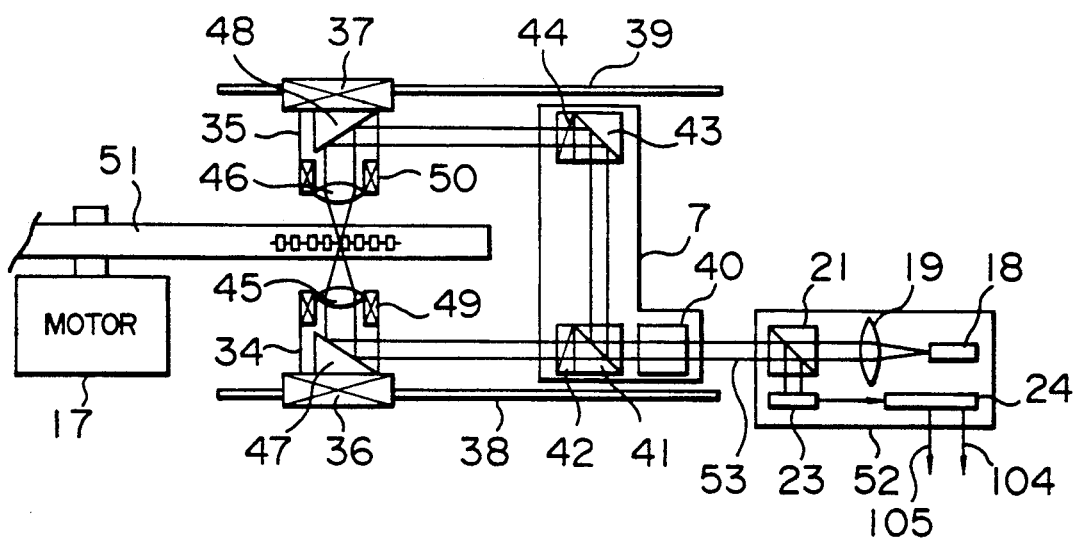
FIG. 8 is a configuration diagram of an optical information recording and reproducing apparatus of the prior art.

FIG. 7 is a diagram showing the recording/reproducing method and the configuration of the stack type optical disk unit in a third embodiment, whereby information is recorded onto/reproduced from the stack type optical disk unit at high speed in the optical information recording and reproducing apparatus of FIG. 1.

Information recording and reproducing operation in FIG. 7 will now be described by referring to FIG. 1.

First of all, information recording is performed by the optical head 3a from the innermost track of the recording face #1, 2a toward the outermost track thereof. After information recording on the recording face #1, 2a has been finished, information recording is performed by the optical head 3b from the outermost track of the recording face #2, 2b toward the innermost track thereof. After information recording on the recording face #2, 2b has been finished, information is recorded onto the recording face #3, 2c by the optical head 3c. Further, information is recorded onto the recording face #4, 2d by the optical head 3d. Information recording is thus sequentially performed surface to surface.

The recording faces #1, #2, #3 and #4 of the optical disk 1 are fixed to the disk rotation shaft 54 of the motor 17. Therefore, recording faces #1, #2, #3 and #4 comprise two kinds of recording faces having different spiral track grooves. The recording faces #1 and #3 are respectively opposite to the recording faces #2 and #4 in winding direction like clockwise and counterclockwise and in spiralling direction like inward and outward.

In the stack type optical disk unit formed by disposing alternately recording faces having different spiral tracks, the recording faces undergo a recording/reproducing operation in order as herefore described. Thereby, the optical heads do not need track search with a long stroke. Therefore, a large amount of sequential data can be recorded at high speed.

The embodiments have heretofore been described by taking the CAV (constant angular velocity) scheme, in which the number of sectors per track is fixed, as an example. In order to make the recording density of a track nearly constant, however, the MCAV (modified constant angular velocity) scheme, in which the number of sectors is increased as the track advances from an inner portion of the recording face to an outer portion, may also be used.

In the foregoing description of the various embodiments, a plurality of optical heads undergo tracking control as one body. As a matter of course, however, tracking control may be exercised over respective optical heads independently when sufficient control performance cannot be obtained because of track pitch precision of recording faces or mounting precision of optical heads.

Further, in the foregoing description of the above embodiments, only the minimum of components required for explaining the present invention has been described. It is a matter of course that addition of error correction codes for making error corrections of the optical disk, an error correction circuit, and so on may be used as occasion demands.

We claim:

1. An optical information recording and reproducing apparatus for recording and reproducing signals by irradiating a laser beam onto an optical disk unit, the disk unit having N (where N≧2) disklike recording faces, each of the recording faces having a track divided into sectors forming units of information recording/reproducing operation and is fixed in stack to an axis of rotation of the disk unit, the apparatus comprising:

stationary optical means including a laser light source, a collimator, a reflector and a detector for the reflected beam from the recording faces;

N sets of focusing means respectively for focusing a collimated beam generated by the stationary optical means onto each of the recording faces;

beam distributing means for selectively distributing the collimated beam to a set of the focusing means;

servo means for focusing the output from the focusing means onto the tracks and for tracking the tracks;

search means for transferring each of the focusing means to a target track on the respective recording faces; and a set of information recording and reproducing means for recording/reproducing information into/from selected sectors.

2. An apparatus according to claim 1, wherein the search means transfers each of the focusing means to one of the directions of from inner to outer portion and from outer to inner portion of the respective recording faces alternately from one recording face to another.

3. An apparatus according to claim 1, wherein the stationary optical means further comprises an actuator for driving the collimator, and the servo means drives the actuator to change the exit angle of the collimated beam from the stationary means and thereby performs a servo focusing.

4. An optical information recording and reproducing apparatus for recording and reproducing signals by irradiating a laser beam onto an optical disk unit, the disk unit having N (where N≧2) disklike recording faces, each of the recording faces having a track divided into sectors forming units of information recording/reproducing operation and is fixed in stack to an axis of rotation of the disk unit, the apparatus comprising:

two sets of stationary optical means, each including a laser light source, a collimator, a reflector and a detector for the reflected beam from the recording faces;

N sets of focusing means respectively for focusing a collimated beam generated by the stationary optical means onto each of the recording faces;

beam distributing means for selectively and simultaneously distributing the collimated beam to two sets of the focusing means;

servo means for focussing the output from the focusing means onto the tracks and for tracking the tracks;

search means for transferring each of the focusing means to a target track on the respective recording faces; and two sets of information recording and reproducing means for recording/reproducing information into/from selected sectors.

5. An apparatus according to claim 4, wherein the stationary optical means further comprises an actuator for driving the collimator, and the servo means drives the actuator to change the exit angle of the collimated beam from the stationary means and thereby performs a servo focusing.

6. A method of recording and reproducing information in an optical disk unit having a plurality of disklike recording faces fixed in stack to an axis of rotation of the disk unit, the axis having a start end and a direction, each of the recording faces having a spiral track divided into sectors forming units of information recording/reproducing operation and having respective focusing means for focusing a collimated laser beam onto the track, the method comprising steps of:

successively displacing an orientation of the respective recording faces to the rotation direction of the disk unit by an angle equivalent to an integer times the angle of the sector in the rotation direction or by an angle equivalent to 360° divided by the number of the recording faces, commencing with a recording face located at the start end of the axis and to the direction of the axis;

inverting the directions of winding of the spiral tracks on the respective recording faces alternately from one recording face to another, commencing with a recording face located at the start end of the axis and to the direction of the axis; and transferring each of the focusing means to one of directions of from inner to outer portion and from outer to inner portion of the respective recording faces alternately from one recording face to another, thereby recording/reproducing information into/from the recording faces.

* * * * *